C. H. WILLIAMS.
ANIMAL NOSE BAGS.
No. 176,914. Patented May 2, 1876.
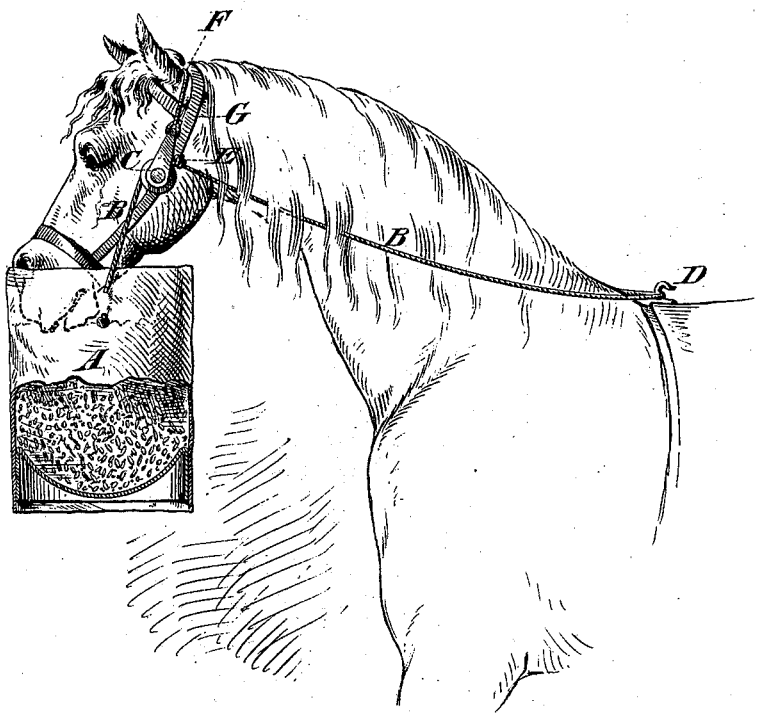
WITNESSES:
INVENTOR:
C. H. Williams
BY
ATTORNEYS.

UNITED STATES PATENT OFFICE.

CRATON H. WILLIAMS, OF NEW YORK, N. Y.

IMPROVEMENT IN ANIMAL NOSE-BAGS.

Specification forming part of Letters Patent No. 176,914, dated May 2, 1876; application filed February 21, 1876.

*To all whom it may concern:*

Be it known that I, CRATON H. WILLIAMS, of the city, county, and State of New York, have invented a new and useful Improvement in Attaching Nose-Bags, of which the following is a specification:

My invention relates to attaching the nose-bag, used for feeding horses while standing in the street, to cords or straps passing through pulleys near the top of the head and back to the check-rein or water-hook, in such manner that when the horse extends his neck to reach the feed in the bottom of the bag the cord will draw the bag up, so that he reaches it without difficulty, and when he contracts his neck, and raises his head to eat, the cords will run out through the pulleys and let the bag down, to afford space for chewing freely and for the admission of air.

The invention consists in knotting the cord that holds the bag so that the horse can raise his nose to the top, but not outside of the bag, the horse being thus prevented from scattering and wasting his feed, while he is allowed to chew his grain without breathing directly into the bag.

The drawing is a side elevation of a bag attached to a horse's head according to my invention.

A is the bag; B, the cord; C, the pulleys and D the check-rein or water-hook.

The cord is knotted at E, to be stopped by the pulleys and prevent the bag from running down too far.

Any suitable guides may be used instead of the pulleys, if preferred, but they will probably be the best.

The pulleys are in this example represented as being suspended by a cord, F, passing over the head, but I intend to buckle them onto the head-strap G in practice—say, by the same straps by which the throat-latch is buckled on; but they may be attached in any approved way.

Having thus described my invention, I claim as new and desire to secure by Letters Patent—

The nose-bag attachment for animals, consisting of a cord, B, knotted at E, in combination with head-strap and pulleys, as and for the purpose specified.

CRATON H. WILLIAMS.

Witnesses:
JOHN D. DEMAOT,
JAMES A. McCAGNEY.